United States Patent [19]

Wada et al.

[11] 4,074,068

[45] Feb. 14, 1978

[54] FLYING PRINTING SYSTEM USING TYPE BELT

[75] Inventors: Tasaku Wada; Satoru Nakabo, both of Tokyo, Japan

[73] Assignee: Kokusai Denshin Denwa Kabushiki Kaisha, Japan

[21] Appl. No.: 714,276

[22] Filed: Aug. 13, 1976

[30] Foreign Application Priority Data

Aug. 15, 1975 Japan .................................. 50-99361

[51] Int. Cl.[2] .......................... B41J 1/00; H04L 15/34

[52] U.S. Cl. ................................ 178/23 R; 101/93.14

[58] Field of Search .......................... 101/93.13, 93.14; 178/23 R, 30

[56] References Cited

U.S. PATENT DOCUMENTS 2,993,437 7/1961 Demer et al. ..................... 101/93.14

*Primary Examiner*—Thomas A. Robinson

*Attorney, Agent, or Firm*—Robert E. Burns; Emmanuel J. Lobato; Bruce L. Adams

[57] ABSTRACT

A flying printing system using a type belt, in which in order to determine a type pitch M different from a predetermined print pitch N determined by the pitch of type hammers, the respective numbers $d_1$ and $d_2 (d_1 > d_2)$ of print pitches N and type pitches M per a unit length L selected to be an integral of the print pitch N are selected so that $M = N \cdot d_1/d_2$. Types are arranged on the type belt in the order such that respective telegraph codes of the successively arranged types successively increase or decrease in binary numbers. Type-corresponding codes are shifted in a shift register in response to shift pulses synchronized with shifting of each type of the type belt. The type-corresponding codes in the shift register and input codes to be printed are compared with each other at time intervals $d_1/d_2$ times the pulse intervals of the shift pulses to obtain a coincidence output to thereby drive the corresponding type hammers. Accordingly, the drive power capacity of the type hammer can be effectively reduced.

4 Claims, 15 Drawing Figures

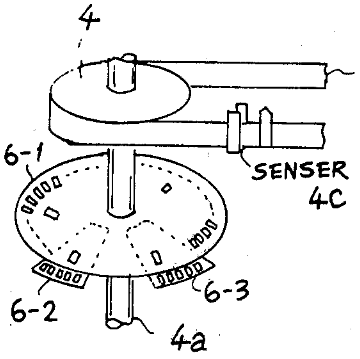
Fig.8A
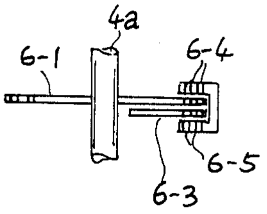
Fig.8B
| CCP-1 | CP2a | CP-2 | | | | | |
|---|---|---|---|---|---|---|---|
| | | 1 | 2 | 3 | ........... | 14 | 15 |
| I | 1 | 6 | 11 | 16 | ........... | 71 | 76 |
| II | 2 | 7 | 12 | 17 | ........... | 72 | 77 |
| III | 3 | 8 | 13 | 18 | ........... | 73 | 78 |
| IV | 4 | 9 | 14 | 19 | ........... | 74 | 79 |
| V | 5 | 10 | 15 | 20 | ........... | 75 | 80 |
| I | 1 | 6 | 11 | 16 | ........... | 71 | 76 |
| II | ⋮ | ........... | | | | | |
| ⋮ | ⋮ | ........... | | | | | |
Fig.10

FLYING PRINTING SYSTEM USING TYPE BELT

FIELD OF THE INVENTION

This invention relates to a flying printing system employing a type belt.

BRIEF DESCRIPTION OF THE PRIOR ART

The line printer system usually employed is a so-called flying printing system in which types on a type drum or belt driven at the high speed are instantaneously selected and printed in accordance with input code signals, but which requires a supply of an appreciably large pulse-shaped current to magnets for driving hammers. Accordingly, in this system, if the order to types on the type belt and the order of input code signals are coincident with each other during a long letter train, many magnets of the type hammers are simultaneously actuated so that this requires a tremendous power level. Accordingly, it is necessary to prepare a power source which is sufficient for such operation.

Further, if the types on the type belt are arranged at a short pitch from adjacent ones of them, there is the possibility that a slight deviation of the type hammer from the correct position of a desired one of the types on the type belt driven at the high speed causes the adjoining types to be partly printed to deteriorate the resulting print quality. In addition, the type belt is likely to crack between adjacent ones of the types, so that the service life of the type belt is shortened.

BRIEF SUMMARY OF THE INVENTION

An object of this invention is to provide a flying printing system in which the type pitch of the type belt is enlarged under a certain condition to decrease the maximum number of letters to be simultaneously printed, thereby to reduce and level off the power dissipation, to prevent simultaneous printing of adjoining types and to provide for prolonged service life of the type belt.

BRIEF DESCRIPTION OF THE DRAWINGS

The principle, construction and operation of this invention will be clearly understood from the following detailed description taken in conjunction with the accompanying drawings, in which:

FIGS. 8A and 8B are a perspective view and an elevation illustrating an example of the periphery mechanism of a pulley employed in this invention;

FIG. 10 is a diagram explanatory of the operation of the example shown in FIGS. 7A, 7B and 7C.

DETAILED DESCRIPTION OF THE INVENTION

Figure 1:
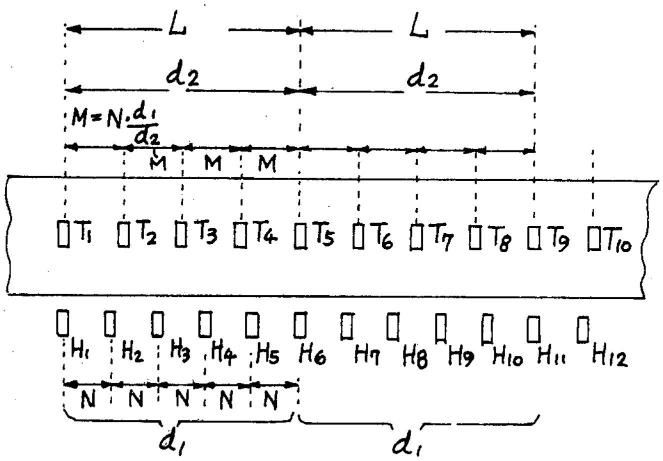
FIG. 1 is a diagram illustrating the relationship between the type positions on a type belt and the print positions in the system of this invention.

With reference to FIG. 1, the relationship between the type positions and the print positions of a type belt for use in this invention will first be described. If the type positions of the type belt are respectively taken as $T_1$, $T_2$, . . . , if their pitches are taken as M, if the positions of type hammers (the print positions) are taken as $H_1$, $H_2$, . . . , if their pitches are taken as N and if the number of print spacings and the number of type spacings per unit length L are respectively taken as $d_1$ and $d_2$, they bear such a relationship that $M=N\cdot d_1/d_2$. In the illustrated example, $d_1=5$ and $d_2=4$. Accordingly, the type pitch $M$ in this case is that $M=N\cdot 5/4$, and the positions of the types which can be simultaneously printed are $T_1$, $T_5$, $T_9$, . . . while the type hammers to be actuated therefor are $H_1$, $H_6$, $H_{11}$, . . . . In this case, the type hammers $H_1$, $H_6$, $H_{11}$, . . . operate with respect to the types $T_1$, $T_5$, $T_9$, . . . only when input code signals are coincident with the positions of the abovesaid hammers, and these hammers do not respond to other input code signals.

Figure 2A:
FIGS. 2A, 2B and 3 are diagrams explanatory of the relationships between the types on the travelling type belt and the print positions corresponding to type hammer positions in the system of this invention.
Figure 2B:
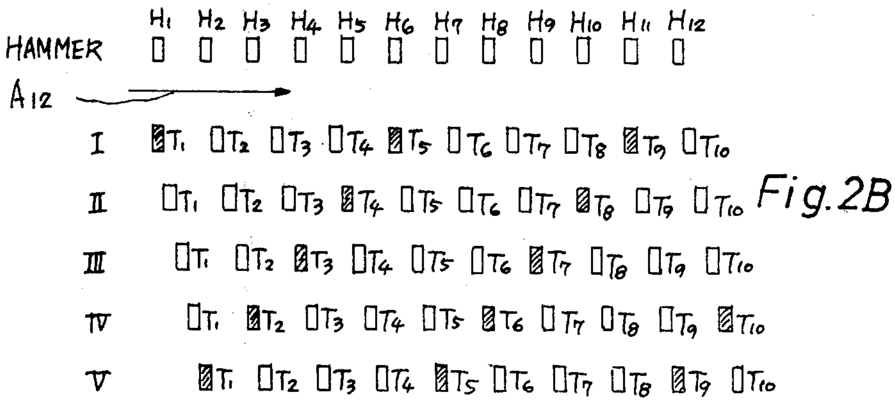
Figure 3:
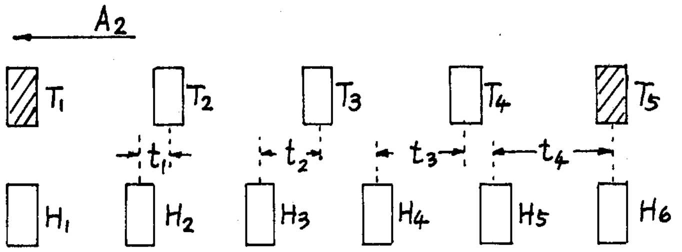

Referring now to FIGS. 2A, 2B and 3, a description will be given with regard to the shifting of the positions of the type hammers in accordance with the travelling of the type belt 1. Let it be assumed that the types $T_1$, $T_2$, . . . $T_{10}$ of the type belt 1 travel in the direction of the arrow $A_{11}$ relative to the positions of the type hammers $H_1$, $H_2$, . . . $H_{12}$, as shown in FIG. 2A. In a case (I), the type hammers $H_1$, $H_6$ and $H_{11}$ are respectively opposed to the types $T_1$, $T_5$ and $T_9$ and, in this case, if input code signals are coincident with these types, printing takes place. Next, in a case (II), the type hammers $H_2$, $H_7$ and $H_{12}$ oppose to the types $T_2$, $T_6$ and $T_{10}$, respectively; in a case (III), the type hammers $H_3$ and $H_8$ oppose to the types $T_3$ and $T_7$, respectively; in a case (IV), the type hammers $H_4$ and $H_9$ oppose to the types $T_4$ and $T_8$, respectively; and in a case (V), the type hammers $H_5$ and $H_{10}$ oppose to the types $T_5$ and $T_9$, respectively. In the above cases, printing is achieved when input code signals are coincident with the types. That is, in this invention, the print pitch and the type pitch of the type belt 1 are determined to bear a specific relationship to each other, by which circuits for driving the type hammers are divided, for example, into five groups: the first group for driving the type hammers $H_1$, $H_6$, $H_{11}$, . . . , the second group for the type hammers $H_2$, $H_7$, $H_{12}$, . . . , the third group for the type hammers $H_3$, $H_8$, $H_{13}$, . . . , the fourth group for the type hammers $H_4$, $H_9$, $H_{14}$, . . . , and the fifth group for the type hammers $H_5$, $H_{10}$, $H_{15}$, . . . . Consequently, even in a case where the order of input code signals and the order of types of the type belt 1 are coincident with each other, the hammers to be simultaneously actuated are limited only to those of any one of the abovesaid five groups. FIG. 2B shows the case where the type belt 1 travels in the direction of an arrow $A_{12}$.

As is evident from the foregoing description, by determining the print pitch N and the type pitch M in a specific relationship to each other, the number P of types to be simultaneously printed can be reduced to $P=R/d_1$ (where R is the number of digits of one line). For example, if the number of types of one line R is 80 and if the number of print pitches $d_1$ is 5, the maximum number P of types to be simultaneously printed is that $P=80/5=16$. That is, even when the input code signals and the types corresponding thereto are coincident with each other at all types, the number of types which are simultaneously printed in this case is 16, which is 1/5 of 80 types in the conventional system.

FIG. 3 shows the state in which the types $T_1$ and $T_5$ are respectively opposite to the type hammers $H_1$ and $H_6$. When the type belt 1 moves in the direction of the arrow $A_2$, the types $T_2$, $T_3$, $T_4$ and $T_5$ are respectively and successively opposite to the type hammers $H_2$, $H_3$, $H_4$ and $H_5$ after respective periods of time $t_1$, $t_2$, $t_3$ and $t_4$, as shown in FIG. 3. In Table 1, there are shown examples of the relationships among the print pitch N, the coefficient $d_1$ of the print pitch, the type pitch M, the coefficient $d_2$ of type pitch, the number of types R of one line and the maximum number of types to be simultaneously printed. In the Table 1, (1) and (2) indicate the cases where the print pitch is 2.54mm which is a standard pitch, and (3) and (4) indicate the cases where the print pitch is twice the standard one, that is, 5.08mm.

from the reversible shift register 12) and the code from the secondary code memory 13 coincide with each other, printing immediately takes place.

Figure 4:
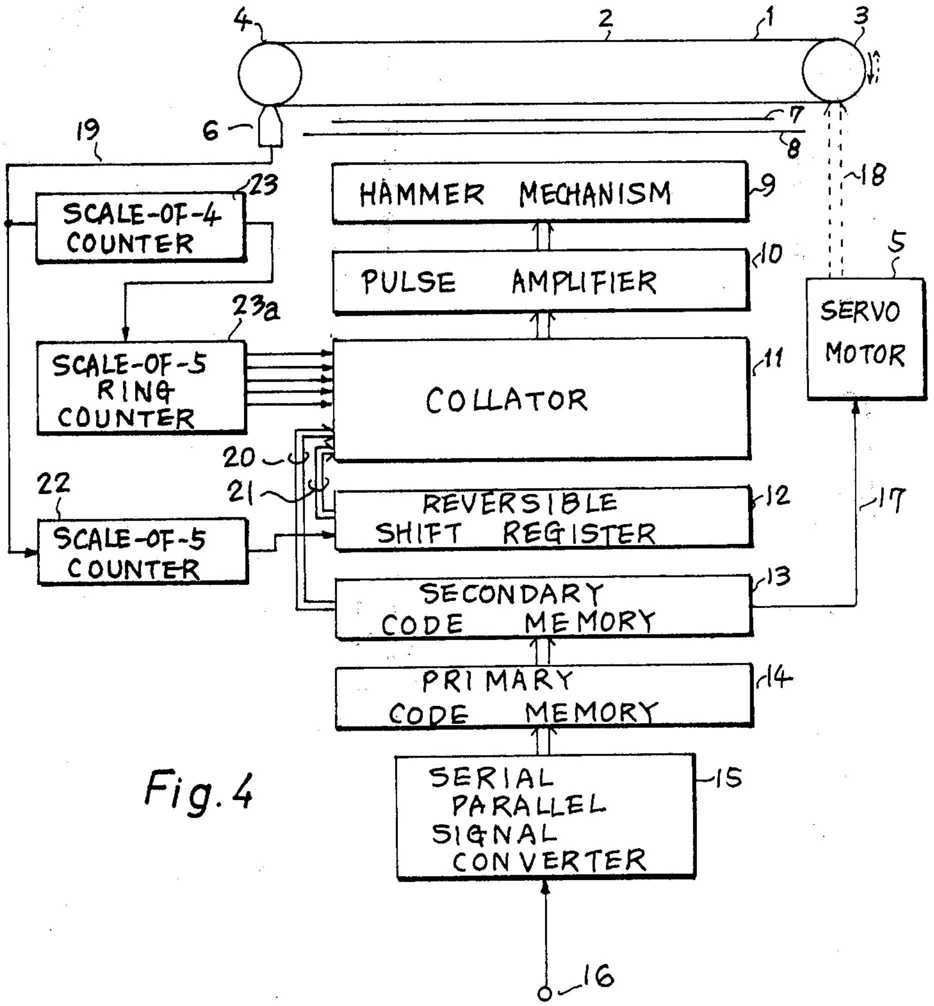
FIG. 4 is a block diagram illustrating a basic construction of the system of this invention.
Figure 5:
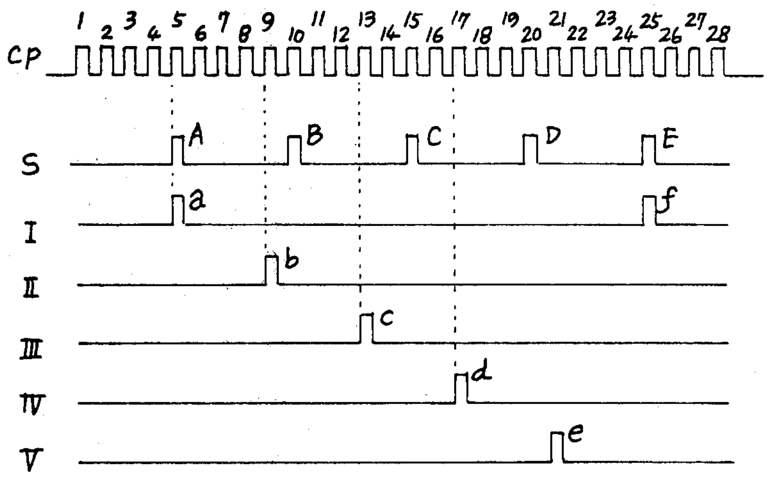
FIG. 5 shows time charts explanatory of the operation of the example shown in FIG. 4.
Figure 6:
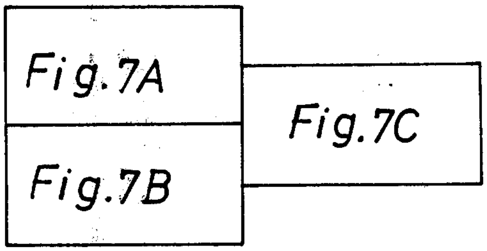
FIG. 6 is a diagram illustrating the relationship of FIGS. 7A, 7B and 7C.

With reference to FIGS. 4 and 5, the example of this invention shown in FIG. 4 will be further described in detail. Clock pulses CP derived from the sensor 6 (five clock pulses corresponding to one type pitch) are applied to a scale-of-four ring counter 23 and the scale-of-five counter 22 through the line 19. The scale-of-five counter 22 produces one carry pulse every five clock pulses and its carry pulses are applied to the reversible shift register 12. The scale-of-four ring counter 23 produces one carry pulse every four clock pulses. These carry pulses are distributed by a scale-of-five counter **23*a* into five outputs, which are respectively applied to terminals I to V of the collator 11. The five outputs I to V collate the codes from the secondary code memory 13 with the type-corresponding codes from the reversible shift register 12 in such time relationship as shown in FIG. 5**.

Table 1

| Example | Number of types of one line R | Coefficient of print pitch $d_1$ | Coefficient of type pitch $d_2$ | Print pitch N(mm) | Type pitch $M=N\times\frac{d_1}{d_2}$ (mm) | Maximum number of types simultaneously printed $P=R/d_1$ |
|---|---|---|---|---|---|---|
| (1) | 80 | 5 | 4 | 2.54 | 3.175 | 16 |
| (2) | 136 | 8 | 7 | 2.54 | 2.903 | 17 |
| (3) | 40 | 4 | 5 | 5.08 | 4.064 | 10 |
| (4) | 40 | 8 | 12 | 5.08 | 3.39 | 5 |

With reference to FIG. 4, a basic example of the flying printing system of this invention will be described. A type belt 1 having a joint 2 is held by pulleys 3 and 4 and alternately driven in the right direction and the left direction by the pulley 3 coupled to a shaft 18 of a servo motor 5. The type positions of the type belt 1 thus driven are detected by a sensor 6, which generates pulses for shifting a reversible shift register 12 through a scale-of-5 counter 22 in synchronism with the travelling of the types. The reversible shift register 12 shifts code signals (i.e. type corresponding codes) respectively corresponding in the binary number order to telegraph code of types on the type belt 1. On the other hand, input code signals applied to a terminal 16 are sequentially stored in a primary code memory 14 through a serial-parallel signal converter 15. When the primary code memory 14 has been filled with the codes of one line or supplied with a line feed code, the stored codes are transferred from the primary code memory 14 to a secondary code memory 13. Upon application of the codes to the secondary code memory 13, the servo motor 5 is started through a line 17. By the driving of the servo motor 5, the type belt 1 is moved and the codes stored in the reversible shift register 12 are shifted in synchronism with the travelling of types of the type belt 1 by the carry pulses of the scale-of-5 counter 22, which is controlled by the output pulses of the sensor 6 through a line 19. The code train in the secondary code memory 13 and the code train in the reversible shift register 12 are respectively applied through lines 20 and 21 to a collator 11, in which the two code trains are collated code by code with each other. When the compared two codes coincide with each other, a corresponding hammer magnet of a hammer mechanism 9 is driven through a pulse amplifier 10 to actuate a corresponding hammer, by which a desired one of types of the type belt 1 is printed on a print paper 7 through an ink ribbon 8. In this case, when the type i.e. (the code As shown in FIG. 5, the scale-of-five counter 22 produces each of pulses A to E every five clock pulses so that the type-corresponding codes in the reversible shift register 12 are shifted in synchronism with the travelling of the types of the type belt 1. On the other hand, the codes of the secondary code memory 13 are collated with the type-corresponding codes of the reversible shift register 12 in the time relationships of the outputs I to V from the scale-of-five ring counter **23*a*. With such a code collating system, the number of digits to be collated at the same timing is 1/5 of the total number of digits in one line, so that the number of hammers to be simultaneously actuated is also 1/5. These relationships are shown in FIGS. 1 to 3**.

The scale-of-four counter 23 and the scale-of-five ring counter **23*a*** can be respectively replaced by scale-of-20 counters.

The type belt 1 may also be driven in one direction and, in this case, the shift register 12 may be a mere shift register.

From the standpoint of the gist of this invention, the type pitch M can be selected at will with respect to the print pitch N, but unnecessarily enlarged pitch M is not preferred because of an increase in the length of the type belt to be driven.

Figure 7A:
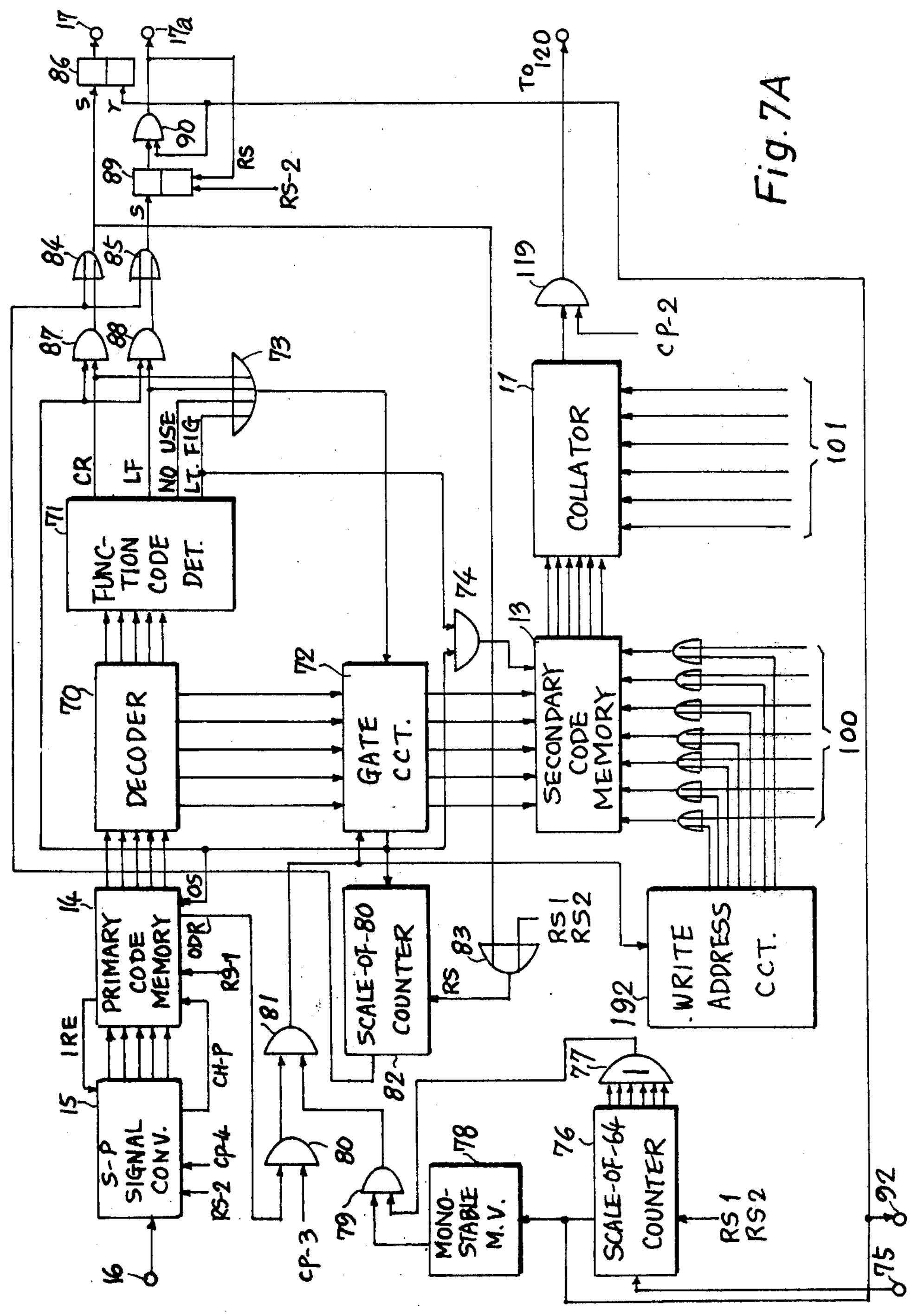
FIGS. 7A, 7B and 7C show a block diagram illustrating a more detailed example of this invention.
Figure 7B:
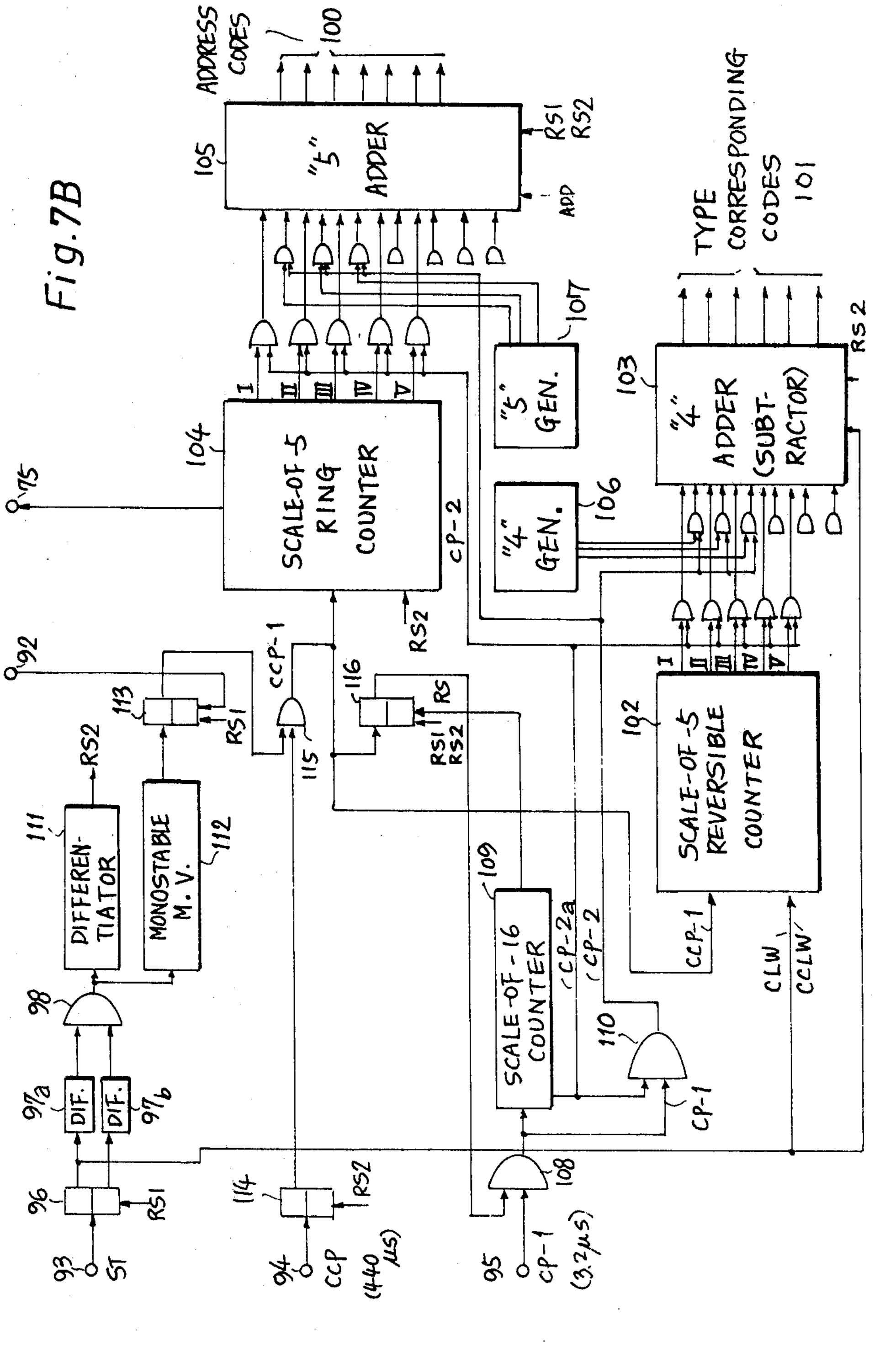
Figure 7C:
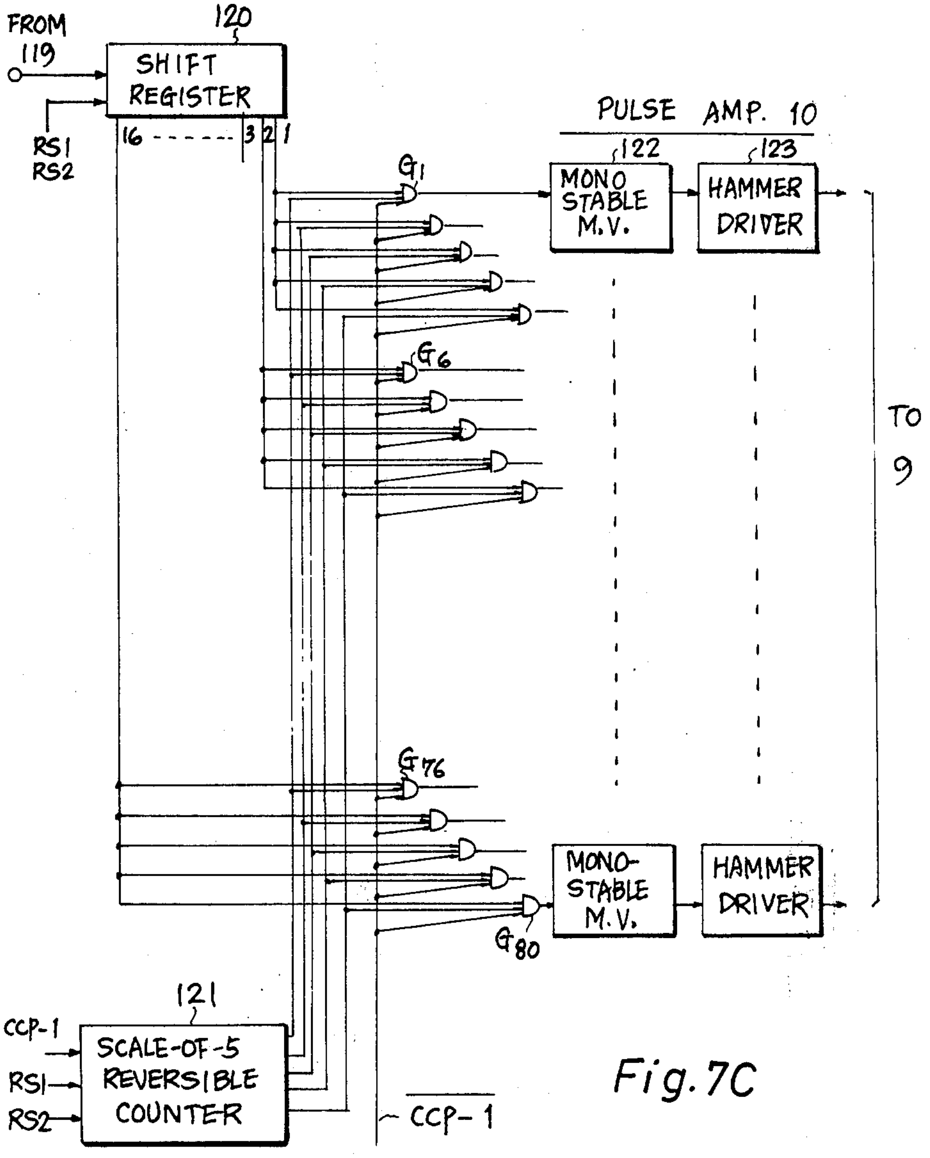
Figure 9:
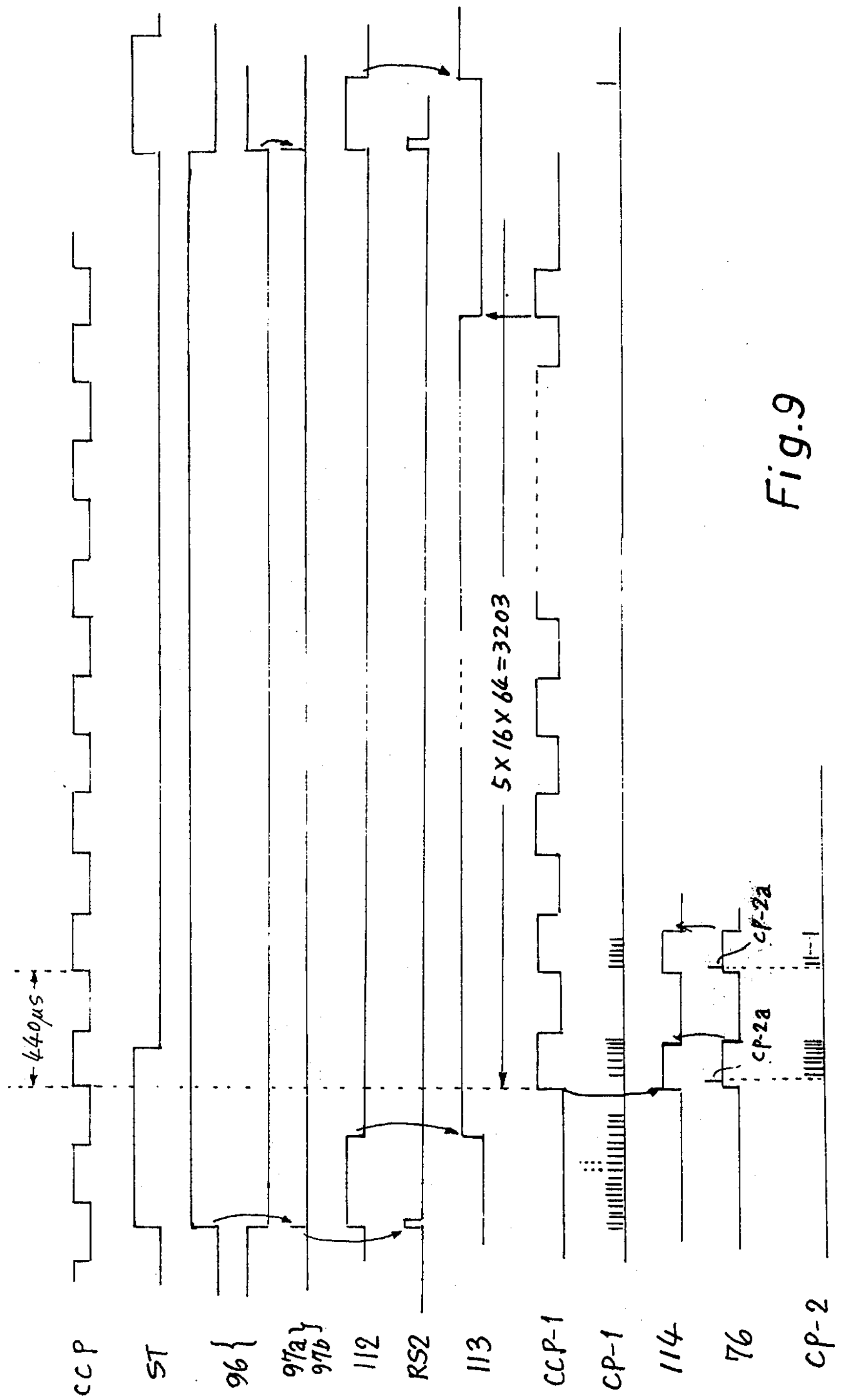
FIG. 9 shows time charts explanatory of the operation of the example shown in FIGS. 7A, 7B and 7C.

With reference to FIGS. 7A, 7B and 7C, a more concrete example of this invention will be described in detail. When the electric power is supplied to the device, all the employed logic circuits are reset to the respective initial states by reset pulses from a reset pulse generator (not shown).

(Storage into the secondary memory)

A start-stop 5-unit telegraph signal of serial signal configuration (International Alphabet No. 2 Code) applied from the terminal 16 is converted at the serial-parallel signal converter 15 into the parallel signal configuration, which is applied to the primary code memory 14. This primary code memory 14 is a fast-in fast-out register of 160 channels, by way of example. When an input register empty signal IRE is applied from the memory 14 to the converter 15, the converted signal of parallel signal configuration is stored, code by code, in the primary code memory 14 in response to character pulse (CH-P) produced when the stop element of each telegraph code is detected. The stored codes are automatically shifted to the output side by internal clock pulses of 500 Kilo-Hz. The output bits of the primary code memory 14 are applied to a decoder 70, which is a matrix by way of example and employed to classify function codes and printed codes in combination with a function code detector 71 and a gate circuit 72, etc. The function code detector 71 detects function codes CR form (carriage return), LF for line feed a "NO USE" corresponding to FIGS. of Letters "F", "G", "H", LT for Letters and "FIG." Figures, so that any of detect pulses is applied through an OR gate 73 to the gate circuit 72 to close it. Accordingly, since the gate circuit 72 is closed in response to any of detect pulses of the function code detector 71, only printed codes are applied to a secondary code memory 13 through the decoder 70 and the gate circuit 72. An additional one bit of "0" or "1" respectively indicative of "LT" and "FIG." is added through a gate 74 to the five bits from the gate circuit 72. In this connection, types on the type belt 1 are arranged on a line block by block for types of "FIGS." and types of "LT". A scale-of-64 counter 76 counts pulses from a terminal 75 (described below) to check the completion of printing of one line. When a printing operation of one line is completed, each of all the output bits of the counter 76 assume the state "0" so that a NAND circuit 77 assums the state "1" at its output. On the other hand, a monostable multivibrator 78 is set by the carry pulse of the counter 76, so that the carry pulse of the counter 76 passes through an AND gate 79 and then is applied to an AND gate 81 to open it. An AND gate 80 is opened by an output ODR (output data ready) of the memory 14, so that clock pulses CP-3 of 8 micro seconds are applied through the AND gates 80 and 81 to the gate circuit 72. According, codes from the primary code memory 14 are stored to the secondary memory 13 under control of the clock pulses CP-3. In this case, addresses of the memory 13 are indicated by the seven output bits of a write address circuit 192. The clock pulses CP-3 passed through the gate circuit 72 are also applied to a scale-of-80 counter 82 to count-up the counting state of the counter 82 and further applied to the output strobe OS of the memory 14 to read out the just succeeding code. The scale-of-80 counter 82 is reset through an OR circuit 83 by reset pulses RS1 and RS2 and the carrige return code "CR" detected by the detector 71. This scale-of-80 counter 82 is employed to perform automatic carriage return and the line feed when no "CR"code and no "LF" code are detected during eighty printed codes.

After all the stored codes are read out of the primary code memory 14, the input telegraph codes are read out under control of the signal ODR and the signal OS when the new telegraph codes are shifted to the output end of the memory 14. Since the duration of the input telegraph code is sufficiently longer than the time of eight micro-seconds, the input telegraph code is transferred without delay from the primary code memory 14 to the secondary code memory 13.

When the carriage return code "CR" is detected by the function code detector 71, the flip-flop circuit 86 is set, through an AND gate 87 and an OR gate 84, in response to the output of the gate circuit 72. Moreover, the flip-flop circuit 86 is set by the carry pulse of the scale-of-80 counter 82. The servo motor 5 is driven through a line 17 during the set state of the flip-flop circuit 86. The flip-flop circuit 86 is reset by the carry pulse of the scale-of-64 counter 76. The servo motor 5 is stopped after a time of about 50 milliseconds after resetting the flip-flop circuit 86, so that the monostable multivibrator 78 is set during the time of about 50 milliseconds to check the passage of the code through the gate circuit 72.

(Drive of type belt)

When the servo motor 5 is driven, a slit plate 6-1 coupled to the shaft 4*a* of the pulley shown in FIGS. 8A and 8B is also driven, so that type clock pulses CP-1 are derived through a light-electric transducer 6-5 since light from lamps 6-4 reaches the transducer 6-5 when slits on the slit plate 6-1 and a fixed slit plate 6-3 are coincided with one another. Five pulses of the type clock pulses CP-1 are derived from the transducer 6-5 for each type on the type belt 1 at intervals of 440 micro-seconds. A slit plate 6-2 is further provided to generate a type-start position pulse.

When the electric power is initially supplied to the device, the type belt 1 is stopped at the condition shown in FIG. 8A under control of the output of a senser 4C. The type belt 1 is then driven in the counter-clockwise direction and thereafter in the clockwise direction.

The type-start position pulse is applied through a terminal 93 to a flip-flop circuit 96 shown in FIG. 7B. The flip-flop circuit 96 is alternately set and reset in response to the type-start position pulses.

(Collation)

In this example, it is assumed that a ratio of the type pitch to the hammer pitch is a ratio 5/4. In the collator 11, the output code of the secondary code memory 13 is compared with the type corresponding codes 101. The type corresponding codes 101 are of six bit codes and provided by a scale-of-5 reversible counter 102 and a "4" adder 103 so that the type corresponding codes 101 successively telegraph codes of types on the type belt 1 in the travelling direction. In other words, the types are arranged on the type belt 1 in the order such that respective telegraph codes of the successively arranged types successively increase or decrease in binary numbers.

The printed codes stored in the secondary code memory 13 are read out under control of address codes 100, which are produced by a scale-of-5 ring counter 104 and a "5" adder 105, etc.

The "5" adder carries out the adder operation at the clockwise drive direction and the counter-clockwise drive direction for the type belt 1. However, the circuit 103 carries out the adder operation only at the counter-clockwise direction of the type belt 1.

The counters 102 and 104 operate under control of the type clock pulses CCP-1 of a repetition period of 440 microseconds. The circuits 103 and 105 operate under control of the clock pulses CP-2 of a repetition period of 3.2 micro-seconds. The clock pulses CP-1 of a repetition period of 3.2 micro-seconds applied through a terminal 95 are divided into an independent pulse (CP-2*a*) and fifteen successive pulses CP-2 by the use of an AND gate 108, a scale-of-16 counter 109 and an AND gate 110. A "4" generator 106 continuously generates a code of "4". A "5" generator 107 continuously generates a code of "5". Each of the counter 102 and 104 successively generates outputs I, II, III, IV and V in synchronism with the pulses CCP-1. On the other hand, the circuits 105 and 103 perform their addition operation (or subtraction operation) in synchronism with the pulses CP-2. The addition operation in the "5" adder 105 is shown in FIG. 10. As understood from FIG. 10, fifteen addition operations are successively performed in the circuit 105 for one output state I, II, III, IV or V of the counter 104. The operation of the circuit 103 will be readily understood from the above operation, so that details thereof are omitted.

As understood from the above operation, the type corresponding codes 101 successively assume 64 states (000000 to 111111) in the upward direction and the downward direction in accordance with the clockwise travelling direction and the counter-clockwise travelling direction of the type belt 1, so that all the 64 types of the International Alphabet No. 2 Code are successively designated.

Each of the output codes of the secondary code memory 13 is compared with each of the above mentioned type corresponding codes 101 at the collator 11, so that an output of the state "1" or "0" is generated from the collator 11 in response to coincidence or incoincidence of the compared codes. The collating result is passed through an AND gate 119 at the timing of the pulses CP-2 and then stored in a shift register 120, which is a serial-in parallel-out 16 bit shift register.

(Printing Operation)

A scale-of-5 reversible counter 121 operates in synchronism with the scale-of-5 reversible counter 102, so that the former may be commonly used with the former. If the counter 121 assumes the state I, gates $G_1$, $G_6$, . . . $G_{76}$ are opened as understood from FIG. 10 by way of example at the timing of the pulses $\overline{CCP\text{-}1}$. Outputs pulses of the gates $G_1$ to $G_{80}$ are applied to the hammer mechanism 9 through the pulse amplifier 10, which comprises monostable multivibrators 122 and hammer drivers 123.

The carry pulses of the scale-of-5 ring counter 104 are applied through a terminal 75 to count-up the counting state of the scale-of-64 counter 76. When the counter 76 counts up it full scale, the printing operation of one line is completed. The servo motor 5 is stopped by the carry pulse of the counter 76 through the flip-flop circuit 86.

(Selection of Transmission Speed)

Figure 11:
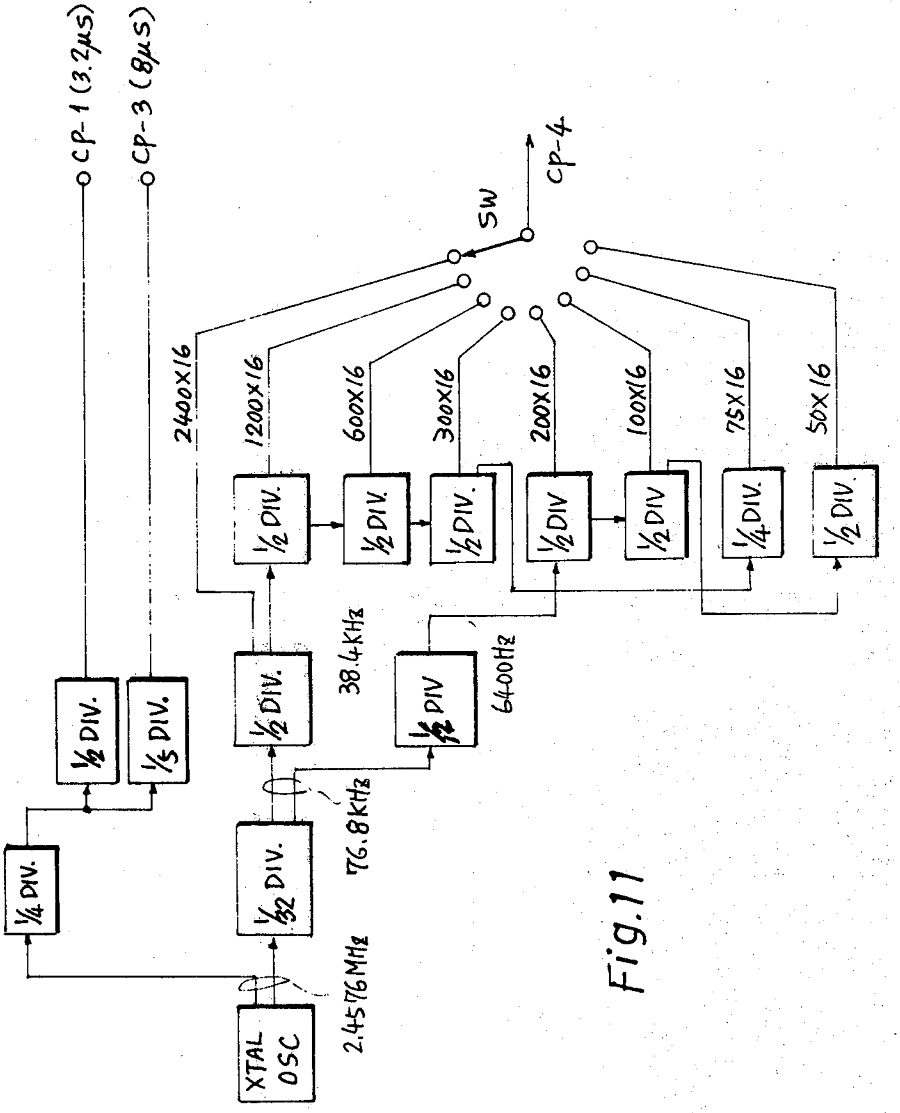
FIG. 11 is a block diagram illustrating an example of a pulse source employed in this invention.

The example shown in FIGS. 7A, 7B and 7C can be applied to receive any one of many telegraph signals having different transmission speeds, such as 50 Bauds, 75 Bauds, 100 Bauds, 200 Bauds, 300 Bauds, 600 Bauds, 1200 Bauds, 2400 Bauds, etc. Selection of the transmission speed is performed by switching the clock pulses CP-4 applied to the serial-parallel signal converter 15. An example of such a clock pulse generator for generating the clock pulses CP-4 is shown in FIG. 11, from which one of many clock pulse trains having a repetition frequency equal to one-sixteenth the transmission speed can be obtained. These different clock pulses are generated at first from a crystal oscillator of 2.4576 MHz and successively frequency-divided as shown. Other clock pulses CP-1 (3.2 micro-seconds) and CP-3 (8 micro-seconds) can be obtained from the same crystal oscillator and frequency dividers.

The example shown in FIGS. 7A, 7B and 7C are designed to operate the maximum transmission speed of 2400 Bauds and eighty printing types on one line. The correct transmission speed is selected by a switch SW. The converted codes from the converter 15 are shifted to the output side of the primary code memory 14 as mentioned above under control of its internal clock pulses of 500 kilo-Hz. The shifted codes are read out under control of the output strove pulses OS generated from the clock pulses CP-3 (8 micro-seconds). Accordingly, writing operation from the primary code memory 14 to the secondary code memory 13 is performed within the duration of 8 microseconds of the pulses CP-3. This time of writing operation is sufficiently shorter than the character length, which is about 4.16 milli-seconds for ten-unit 2400 Bauds telegraph signals.

In this example, the primary code memory 14 is a register of 160 characters. In a case where the scale-of-64 counter 76 is not reset to the state "000000", the input telegraph codes are successively stored in the primary code memory 14. This is a waiting time for printing out. When the scale-of-64 counter 76 is reset to the state "000000", the stored codes are automatically transferred to the secondary code memory 13 under control of the clock pulses CP-3 until the carrige return code "CR" is detected or eighty characters has been transferred.

In this example, the printing time of one line is designed to be about 250 milli-seconds in view of: collation to printing (140.8 milli-seconds = type clock pulses 440 microseconds × 5 × 64); stopping of the type belt (about 50 milli-seconds); re-driving of the type belt to the normal speed (about 60 milli-seconds); and stopping of the type belt (about 50 milli-seconds). In this printing time of 250 milli-seconds, International Alphabet No. 2 Code (7.5 unit) and International Alphabet No. 5 Code (10 unit) are stored by the following number of characters for the transmission speed of 2400 Baiuds to 50 Bauds.

| Transmission Speed (Bauds) | No. 2 Code (7.5 unit) | No. 5 Code (10 unit) |
|---|---|---|
| 2400 | 250/3.12 = 80 | 250/4.16 = 60 |
| 1200 | 250/6.25 = 40 | 250/8.33 = 30 |
| 600 | 250/2.5 = 20 | 250/16.66 = 15 |
| 300 | 250/25.0 = 10 | 250/33.33 = 7.5 |
| 200 | 250/37.5 = 6.66 | 250/50.00 = 5 |
| 100 | 250/75 = 3.33 | 250/100.0 = 2.5 |
| 75 | 250/100 = 2.5 | 250/133.3 = 1.9 |
| 50 | 250/150 = 1.66 | 250/200.0 = 1.25 |

When the transmission speed of the input telegraph signal is of 300 Bauds, 10 characters aned 7.5 characters are stored within the printing time of one line in case of No. 2 Code and No. 5 Code respectively.

The selection of the transmission speed performed by the switch SW can be carried out in an automatic manner. In this case, the duration of unit element of the input telegraph codes is detected by the use of conventional start-stop telegraph synchronization techniques, so that the switch SW is controlled to select a suitable repetition frequency of the clock pulses CP-4. This automatic selection of the transmission speeds is actually useful for monitoring many telegraph channels of different transmission speeds, since initial small errors are allowable for such monitor operation.

As has been described in detail above, by selecting the print pitch and the type pitch of the type belt to be differrent from each other in the line printer system employing the type belt in accordance with this invention, the number of types to be simultaneously printed is reduced to avoid the application of a tremendous shock to the type belt and, by a suitable selection of the type pitch, prolonged service life of the type belt and its efficient operation can be achieved and, further, since the power applied to the hammer magnets can be levelled off, no large power source is required. Moreover, the load to the type belt is levelled, so that the type belt driving source may be small. Thus, this invention is extremely useful in practice.

What we claim is:

1. A flying printing system comprising:

a type belt having thereon types at a type pitch M different from a predetermined print pitch N, the respective numbers $d_1$ and $d_2$ of said print pitches N and said type pitches M per unit length being an integral of said print pitch and being determined under a condition: $M=N \cdot d_1/d_2$, said types being arranged such that respective telegraph codes of the successively arranged types successively change in binary numbers;

drive means coupled to said type belt to drive said type belt at a travelling speed in a travelling direction;

print means including type hammers disposed opposite said type belt and arranged at a pitch corresponding to said print pitch N;

sense means coupled to said drive means to develop type clock pulses indicative of the travelling timing of said type belt;

first count-down means coupled to said sense means for counting down said type clock pusles to one-$d_1$th to develop first counted down pulses;

second count-down means coupled to said sense means for counting down said type clock pulses to one ${}_2$th to develop second counted down pulses;

first shift register means coupled to said second count-down means for developing type corresponding codes successively indicative of telegraph codes of said types on said type belt in synchronism with the traveling of said types on said type belt;

input terminal means receptive of input telegraph codes of serial signal configuration;

signal conversion means connected to said input terminal means for converting said input telegraph codes of serial signal configuration to parallel signal configuration;

primary code memory means connected to said signal conversion means for temporarily storing said converted telegraph codes of parallel signal configuration;

secondary code memory means operatively coupled to said primary code memory means for temporarily storing said converted telegraph codes of parallel signal configuration except function codes;

second shift register means coupled to said first count-down means and said secondary code memory for developing address codes to read out the telegraph codes of parallel signal configuration from the secondary code memory means;

collator means coupled to said first shift register and said secondary code memory for successively comparing each of said read out telegraph codes from the secondary code memory with all of said type corresponding codes at the intervals $d_1/d_2$ times the time intervals of said type clock pulses; and means connected to said collator means and said print means for driving a corresponding one of said type hammers when compared codes coincide with each other at the collator means.

2. A flying printing system according to claim 1, in which said sense means further detects the travelling direction of said type belt.

3. A flying printing system according to claim 2; in which said drive means alternately drive said type belt in a clockwise direction and a counter-clockwise direction, said first shift register means reversively developing said type coresponding codes in accordance with the detected travelling direction of the type belt.

4. A flying printing system according to claim 1, in which said signal conversion means includes selection means for selecting one of clock pulses predetermined in view of possible transmission speeds of said input telegraph codes.

* * * * *